(12) United States Patent
Kaneyasu et al.

(10) Patent No.: US 9,352,662 B2
(45) Date of Patent: May 31, 2016

(54) VEHICLE BATTERY CHARGER AND A FAULT DIAGNOSIS OF RELAY

(71) Applicant: Hitachi Metals, Ltd., Tokyo (JP)

(72) Inventors: Masayoshi Kaneyasu, Itabashi (JP); Takafumi Kai, Isehara (JP); Hiroyuki Yanagisawa, Hitachi (JP); Hiroyuki Ito, Hitachi (JP)

(73) Assignee: HITACHI METALS, LTD., Tokyo (JP)

( * ) Notice: Subject to any disclaimer, the term of this patent is extended or adjusted under 35 U.S.C. 154(b) by 205 days.

(21) Appl. No.: 14/149,588

(22) Filed: Jan. 7, 2014

(65) Prior Publication Data
US 2014/0197790 A1 Jul. 17, 2014

(30) Foreign Application Priority Data

Jan. 17, 2013 (JP) .................................. 2013-006248

(51) Int. Cl.
| | | |
|---|---|---|
| *H02J 7/00* | (2006.01) | |
| *B60L 11/18* | (2006.01) | |
| *B60L 3/00* | (2006.01) | |
| *B60L 3/04* | (2006.01) | |

(52) U.S. Cl.
CPC ............ *B60L 11/1824* (2013.01); *B60L 3/0069* (2013.01); *B60L 3/04* (2013.01); *B60L 11/1803* (2013.01); *B60L 11/1818* (2013.01); *B60L 11/1825* (2013.01); *B60L 11/1846* (2013.01); *B60L 2210/30* (2013.01); *B60L 2230/12* (2013.01); *B60L 2240/547* (2013.01); *B60L 2240/549* (2013.01); *B60L 2240/80* (2013.01); *B60L 2250/10* (2013.01); *B60L 2270/32* (2013.01); *B60L 2270/34* (2013.01); *Y02T 10/7005* (2013.01); *Y02T 10/7088* (2013.01); *Y02T 10/7241* (2013.01); *Y02T 90/121* (2013.01); *Y02T 90/127* (2013.01); *Y02T 90/128* (2013.01); *Y02T 90/14* (2013.01); *Y02T 90/163* (2013.01); *Y02T 90/169* (2013.01); *Y04S 30/14* (2013.01)

(58) Field of Classification Search
USPC ........................................................ 320/109
See application file for complete search history.

(56) References Cited

U.S. PATENT DOCUMENTS

| | | | | |
|---|---|---|---|---|
| 6,970,807 | B2 * | 11/2005 | Kito et al. ...................... | 702/183 |
| 2010/0085060 | A1 * | 4/2010 | Ichikawa et al. .............. | 324/503 |

FOREIGN PATENT DOCUMENTS

JP     2011-160604 A     8/2011

\* cited by examiner

*Primary Examiner* — Samuel Berhanu
(74) *Attorney, Agent, or Firm* — McGinn IP Law Group, PLLC (57) ABSTRACT

A vehicle battery charger for providing a charging current to a rechargeable vehicle battery which stores electric traction power includes a relay for interrupting the charging current, and fault diagnosing means for switching an operating condition of the relay to thereby diagnose a fault in the relay. At a time of starting and/or stopping a supply of the charging current, if a given condition is satisfied, the fault diagnosing means executes a diagnosis of the fault, or if the given condition is not satisfied, the fault diagnosing means does not execute a diagnosis of the fault.

3 Claims, 10 Drawing Sheets

VEHICLE BATTERY CHARGER AND A FAULT DIAGNOSIS OF RELAY

The present application is based on Japanese patent application No. 2013-006248 filed on Jan. 17, 2013, the entire contents of which are incorporated herein by reference.

BACKGROUND OF THE INVENTION

1. Field of the Invention

This invention relates to a vehicle battery charger that provides a charging current to a vehicle with a rechargeable battery for storing electric traction power.

2. Description of the Related Art

Conventionally, a vehicle having a rechargeable battery which is charged by an external charging current and a vehicle battery charger which provides a charging current to that vehicle have been known (see, e.g., JP-A-2011-160604).

The vehicle disclosed by JP-A-2011-160604 is configured to diagnose whether a contact of a relay interposed between supply lines for the charging current is sticking or not before starting the charging, when the rechargeable battery is charged by the external charging current.

SUMMARY OF THE INVENTION

Now, such a relay fault diagnosis is considered to be made in the battery charger side. That is, the diagnosis is considered to be made by turning on/off the relay at least when starting or stopping the supply of the charging current to the vehicle, and as to whether the contact of the relay is not sticking. Thus, for example, it is possible to obviate the situation that current leakage from a terminal of a charging connector due to the sticking of the contact of the relay cannot be interrupted.

However, when the battery charger is not installed in, e.g. a home parking lot and used for charging a particular vehicle, but is installed in, e.g. public premises such as charging stations, etc. and for charging unspecified vehicles, the number of times to turn on/off the relay for diagnosing increases due to the frequency of use of the battery charger for public tending to be high as compared to that for home. Therefore, the integrated value for the on/off times of the relay can exceed a guaranteed value in a relatively short time. That is, the frequency at which the relay operates is increased by diagnosing, and is highly likely to cause an abnormal condition of the relay, such as relay sticking.

Accordingly, it is an object of the present invention to provide a vehicle battery charger, which is capable of optimizing a frequency of a fault diagnosis of a relay, and thereby enhancing its durability.

According to an embodiment of the invention, a vehicle battery charger for providing a charging current to a rechargeable vehicle battery which stores electric traction power comprises:

a relay for interrupting the charging current; and fault diagnosing means for switching an operating condition of the relay to thereby diagnose a fault in the relay, wherein at a time of starting and/or stopping a supply of the charging current, if a given condition is satisfied, the fault diagnosing means executes a diagnosis of the fault, or if the given condition is not satisfied, the fault diagnosing means does not execute a diagnosis of the fault.

In the embodiment, the following modifications and changes can be made.

(i) The given condition is that history information on an operating condition of the vehicle battery charger satisfies a predetermined condition.

(ii) The given condition is that an integrated value for the charging current from a time of a preceding diagnosis execution based on the history information is not less than a given threshold.

(iii) The given condition is that an integrated value for output power of the battery charger from a time of a preceding diagnosis execution based on the history information is not less than a given threshold.

(iv) The given condition is that an elapsed time from a time of a preceding diagnosis execution based on the history information is not less than a given threshold.

(v) The given condition is that an integrated value for a number of operations of the relay from a time of a preceding diagnosis execution based on the history information is not less than a given threshold.

(vi) The given condition is that an integrated value for a charging time from a time of a preceding diagnosis execution based on the history information is not less than a given threshold.

POINTS OF THE INVENTION

According to the vehicular battery charger of the present invention, it is possible to optimize the frequency of the fault diagnosis of the relay, and thereby enhance its durability.

BRIEF DESCRIPTION OF THE DRAWINGS

The preferred embodiments according to the invention will be explained below referring to the drawings, wherein.

DETAILED DESCRIPTION OF THE PREFERRED EMBODIMENTS

First Embodiment

Below will be described one example of a vehicle battery charger in a first embodiment according to the invention with reference to FIGS. 1 to 5.

(Configuration of the Vehicle Battery Charger)

Figure 1:
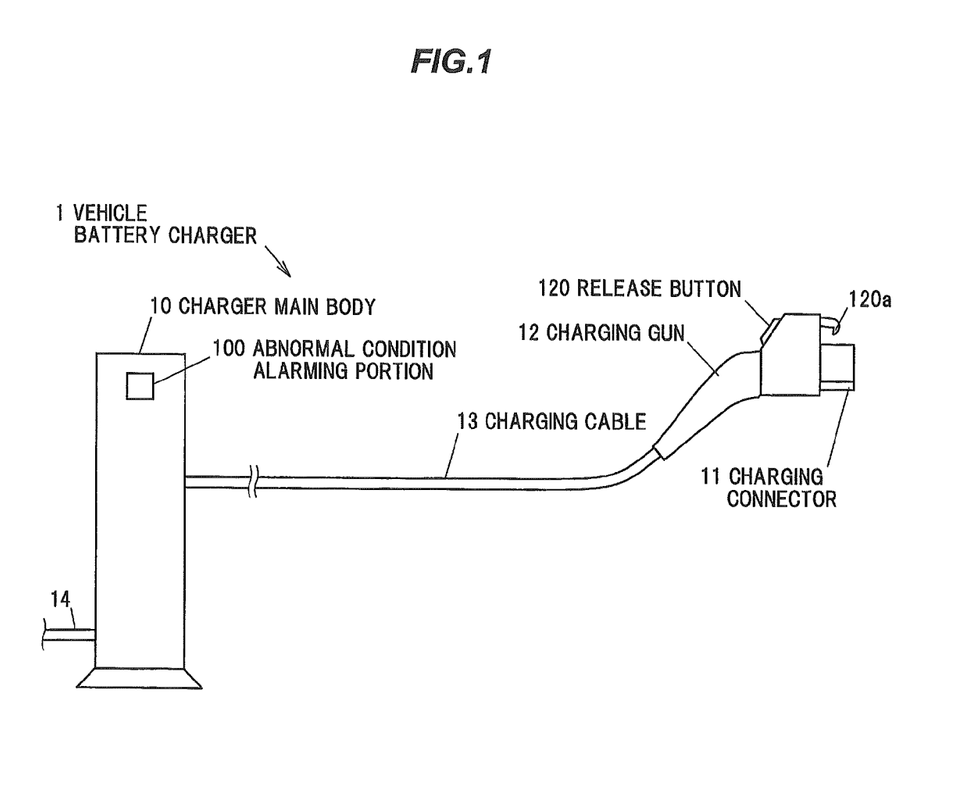
FIG. 1 is a schematic configuration diagram showing a vehicle battery charger in a first embodiment according to the invention.

FIG. 1 is a schematic configuration diagram showing the vehicle battery charger in the first embodiment according to the invention.

This vehicle battery charger 1 is configured to include a charging gun 12 which is provided with a charging connector 11 at a tip thereof, a charging cable 13 which is connected to the charging connector 11 in an inner portion of the charging gun 12, and a battery charger body 10 which charges a vehicle via the charging cable 13 and the charging connector 11. The battery charger body 10 is provided with e.g. an AC 200 V commercial power supply via a power cable 14. Specifications of each part of the vehicle battery charger 1 are compliant with SAE J1772 which is an international standard that defines communication specifications between the battery charger and the vehicle.

This vehicle battery charger 1 is provided e.g. in service areas of highways, parking lots of commercial facilities, parking lots of apartments, etc., to provide a battery charging service to unspecified users. The battery charger body 10 is installed freestandingly on the ground in the parking lots, etc. The battery charger body 10 is provided with an abnormal condition alarming portion 100 for informing an abnormal condition. The abnormal condition alarming portion 100 is e.g. a lamp, which informs an abnormal condition by emitting light, or a buzzer, which informs an abnormal condition by sounding.

The charging gun 12 is provided with a release button 120 and a locking projection 120a. The locking projection 120a is configured in such a manner as to operate in conjunction with the release button 120 being pressed by the user when removing the charging gun 12 from the vehicle.

(Configuration of the Vehicle Charging System)

Figure 2:
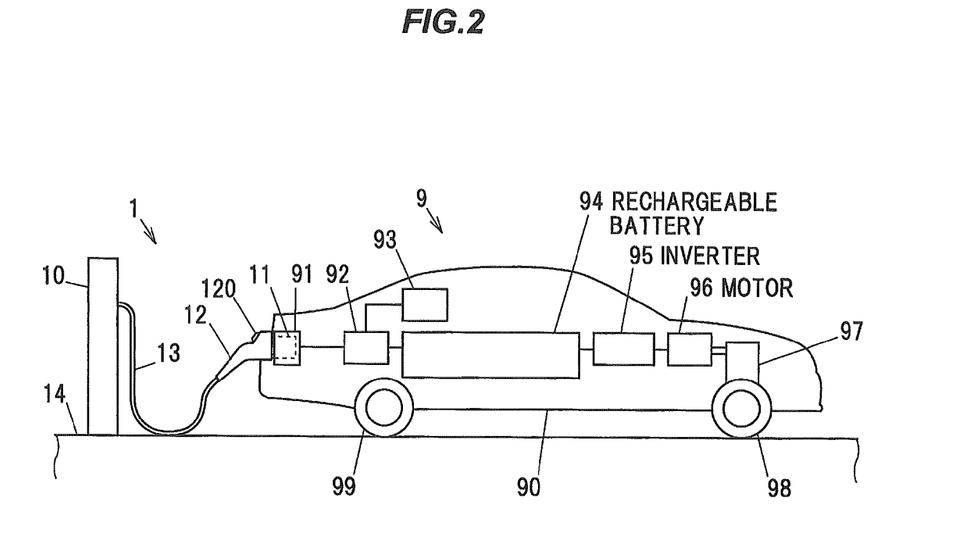
FIG. 2 is a schematic configuration diagram showing use of the vehicle battery charger.

FIG. 2 is a schematic configuration diagram showing use of the vehicle battery charger in the embodiment according to the invention.

A vehicle 9 connected to the vehicle battery charger 1 is an electric vehicle mounted with a motor 96 in a vehicle body 90 as a traction driving source. The vehicle body 90 is mounted with a vehicle side connector 91 to which the charging connector 11 is mated, a charge control circuit 92 which is connected to an input terminal of the vehicle side connector 91, a controller 93 which controls the charge control circuit 92, a rechargeable battery 94, an inverter 95 which provides electric power stored in the rechargeable battery 94 to the motor 96 as a motor current which is switched by PWM (Pulse Width Modulation) control, and a transmission 97 which changes the speed of the output of the motor 96 and transmits it to front wheels 98.

The rechargeable battery 94 is e.g. a lithium ion battery or a nickel hydride battery having a plurality of cells. The rechargeable battery 94 stores an electric traction power for driving the motor 96.

The motor 96 is e.g. an IPM (Interior Permanent Magnet Motor). Incidentally, the vehicle 9 may be a so-called plug-in hybrid vehicle which, in addition to the motor 96, has an internal combustion engine as a driving source to be fueled by a volatile liquid such as gasoline or the like. Further, the vehicle 9 may be a rear wheel drive vehicle which transmits the output of the transmission 97 to rear wheels 99.

The locking projection 120a (see FIG. 1) of the charging gun 12 is configured to engage the vehicle side connector 91, and thereby suppress accidental disengagement from the vehicle side connector 91 of the charging connector 11.

(Circuit Configuration of the Vehicle Battery Charger)

Figure 3:
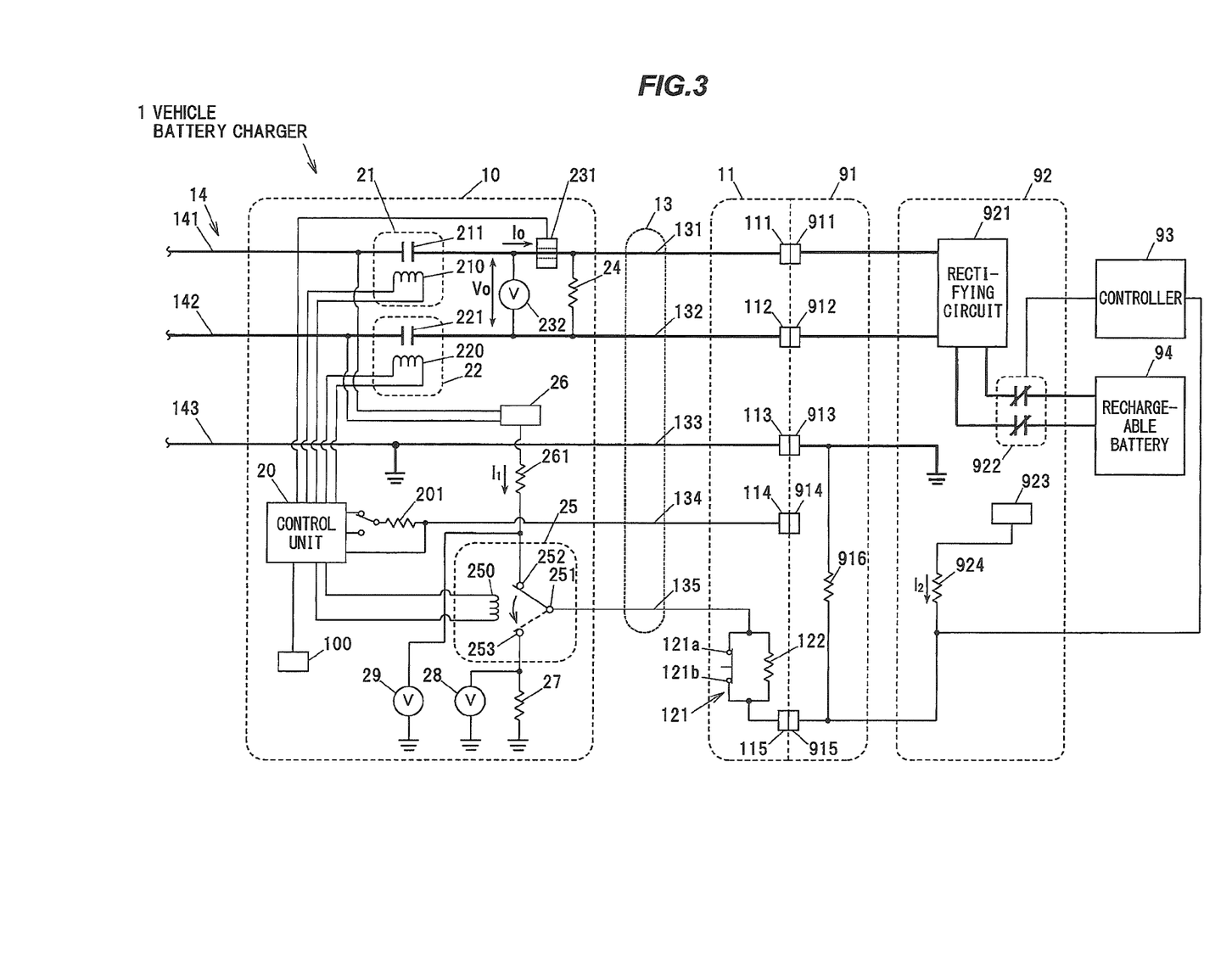
FIG. 3 is a circuit diagram showing a circuit configuration of the vehicle battery charger together with a vehicle side configuration.

FIG. 3 is one example of a circuit diagram showing a circuit configuration of the vehicle battery charger 1 together with a vehicle 9 side configuration.

The battery charger body 10 of the vehicle battery charger 1 is provided with an AC 200 V power supply from the power cable 14. The power cable 14 includes an L phase power line 141, an N phase (neutral phase) power line 142, and a GND line 143 which is grounded.

The charging connector 11 has an L terminal 111 and an N terminal 112 as a pair of charging current output terminals that provide a charging current to the vehicle 9, a GND terminal 113 which is grounded by being connected to the GND line 143, a C terminal 114 as a charge control terminal, and a P terminal 115 as a mating detecting terminal for detecting a mating with the vehicle side connector 91.

The P terminal 115 is connected to a second contact 121b, of a first contact 121a and the second contact 121b of a switch 121 that is operated in conjunction with the release button 120. Between the second contact 121b and the first contact 121a is connected a resistor 122. The resistance of the resistor 122 is, e.g., 330Ω. The switch 121 is operated so that when the release button 120 is pushed, the first contact 121a and the second contact 121b are non-connected, and when the release button 120 is not being pushed, the first contact 121a and the second contact 121b are connected together.

The charging cable 13 has first to fifth electric wires 131 to 135. The first electric wire 131 is connected to the L terminal 111 at one end thereof. Likewise, the second electric wire 132 is connected to the N terminal 112 at one end thereof, the third electric wire 133 is connected to the GND terminal 113 at one end thereof, the fourth electric wire 134 is connected to the C terminal 114 at one end thereof, and the fifth electric wire 135 is connected to the first contact 121a of the switch 121 at one end thereof.

The battery charger body 10 has a control unit 20 for controlling a supply and interruption of the charging current to the vehicle 9. The control unit 20 comprises, e.g., a CPU (Central Processing Unit), which is operated in accordance with a pre-stored program, and a peripheral circuit thereof. The control unit 20 is connected with the abnormal condition alarming portion 100.

Further, the battery charger body 10 has a first relay 21 and a second relay 22 that are switched on (closed) or off (opened) by the control unit 20. The first relay 21 has a contact 211 interposed between the first electric wire 131 and the power line 141, and a coil 210 for switching an open status and a closed status of the contact 211 by electromagnetic force. When the coil 210 is energized by the control unit 20, the coil 210 generates an electromagnetic force, and this electromagnetic force closes the contact 211. When the coil 210 is de-energized, the contact 211 is opened by a biasing force of a spring not shown.

The second relay 22 has a contact 221 interposed between the second electric wire 132 and the power line 142, and a coil 220 for switching an open status and a closed status of the contact 221 by electromagnetic force. The contact 221 and the coil 220 are configured analogously to the contact 211 and the coil 210 of the first relay 21.

When the first relay 21 and the second relay 22 are both on, the vehicle battery charger 1 supplies a charging current to the rechargeable battery 94 of the vehicle 9 via the first electric wire 131 and the second electric wire 132 of the charging cable 13. Further, when at least one of the first relay 21 and the second relay 22 is off, the supply of the charging current is interrupted. That is, the first relay 21 and the second relay 22 can interrupt the charging current.

The first electric wire 131 is provided with an electric current sensor 231. The current sensor 231 is e.g. a Hall element sensor, detects an electric current Io flowing in the first electric wire 131, and outputs a detected signal indicative of the electric current value to the control unit 20.

Further, an AC voltmeter 232 and a diagnostic resistor 24 are connected between the first electric wire 131 and the second electric wire 132. The AC voltmeter 232 detects a voltage between the first electric wire 131 and the second electric wire 132, and outputs a detected signal indicative of the voltage value to the control unit 20. The diagnostic resistor 24 has such a resistance value that an electric current of e.g. 15 mA or more flows therein, when the contact 211 and the contact 221 are closed together.

Further, the battery charger body 10 includes a switching circuit 25 in which a connection between contacts is controlled by the control unit 20. The switching circuit 25 has first to third contacts 251 to 253, and a coil 250. Then, in the switching circuit 25, when the coil 250 is de-energized, the first contact 251 and the second contact 252 are connected together, while the third contact 253 and the first contact 251, and the third contact 253 and the second contact 252 are isolated from each other. Further, in the switching circuit 25, when the coil 210 is energized by the control unit 20, the first contact 251 and the third contact 253 are connected together, while the second contact 252 and the first contact 251, and the second contact 252 and the third contact 253 are isolated from each other.

The first contact 251 is connected with the fifth electric wire 135. The second contact 252 is connected with an output of a DC power supply 26 via a resistor 261 which is provided in the battery charger body 10. The DC power supply 26 is connected to the L phase power line 141 and the N phase power line 142 at an input, converts AC 200 V into e.g. DC 5 V and outputs it. The resistance value of the resistor 261 is e.g. 2700Ω.

The third contact 253 is connected to ground via a resistor 27. The resistance of the resistor 27 is e.g. 150Ω. A DC voltmeter 28 is connected between the ground potential and the third contact 253. The DC voltmeter 28 detects an electric potential at the third contact 251, and outputs a detected signal indicative of the electric potential to the control unit 20. Hereinafter this detected signal is referred to as the "first voltage signal".

Further, a DC voltmeter 29 is connected between the ground potential and the second contact 252. The DC voltmeter 29 detects an electric potential at the second contact 252, and outputs a detected signal indicative of the electric potential to the control unit 20. Hereinafter this detected signal is referred to as the "second voltage signal".

The control unit 20 has a communication function to transmit a PWM (Pulse Width Modulation) controlled pulse signal of information on an allowable current value and the like for the charging current to the vehicle 9. The signal transmitted from the control unit 20 is outputted to the C terminal 114 of the charging connector 11 via a communication resistor 201 and the fourth electric wire 134. Further, the control unit 20 can monitor a fourth electric wire 134 side voltage of the communication resistor 201. This communication function is designed for communication via a receiving circuit not shown which is provided between the controller 93 of the vehicle in compliance with SAE J1772 and a fourth terminal 914 of the vehicle side connector 91.

(Configuration of the Vehicle 9)

The vehicle side connector 91 has first to fifth terminals 911 to 915. When the vehicle side connector 91 is mated to the charging connector 11, the first terminal 911 is connected to the L terminal 111, the second terminal 912 is connected to the N terminal 112, the third terminal 913 is connected to the GND terminal 113, the fourth terminal 914 is connected to the C terminal 114, and the fifth terminal 915 is connected to the P terminal 115. A resistor 916 is connected between the fifth terminal 915 and the third terminal 913. The resistance value of the resistor 916 is e.g. 2700Ω.

The charge control circuit 92 includes a rectifying circuit 921, a relay circuit 922, a DC power supply 923, and a resistor 924. The resistance of the resistor 924 is e.g. 330Ω. The DC power supply 923 has an output voltage of e.g. DC 5 V. The resistor 924 is connected to the DC power supply 923 at one end, while being connected to the fifth terminal 915 at the other end. The DC power supply 923 is provided in order for the controller 93 to detect a disengagement of the charging connector 11. The DC power supply 923 outputs a voltage, for example, when a charging voltage is applied from the vehicle battery charger 1.

The rectifying circuit 921 is connected to the first terminal 911 and the second terminal 912 of the vehicle side connector 91. The rectifying circuit 921 rectifies an alternating current input from the first terminal 911 and the second terminal 912, and outputs it to the relay circuit 922. The rectifying circuit 921 comprises a diode bridge circuit, for example. In addition, an inrush current limiting circuit which limits an inrush current at a time of starting of charging may be provided between the relay circuit 922 and the rectifying circuit 921.

The relay circuit 922 is switched on (closed) or off (opened) by the controller 93 controlling. When the relay circuit 922 is switched on, the rechargeable battery 94 is charged with electric power provided from the first terminal 911 and the second terminal 912.

Further, the resistor 924 is connected to the controller 93 at one end thereof. The controller 93 is capable of detecting a voltage at one end of the resistor 924 (i.e., a potential difference between it and the reference potential).

Here is described a case in which in the present embodiment, the vehicle 9 does not conform to SAE J1772 and does not have the function of communication with the vehicle battery charger 1. Therefore, the vehicle 9 is provided with no receiving circuit which receives a transmitted signal output to the C terminal 114 from the control unit 20 of the vehicle battery charger 1. When the vehicle has the communication function, the control unit 20 allows establishment of communication with the vehicle to detect that the charging connector 11 is mated to the vehicle side connector 91, whereas if the vehicle has no communication function, another method is necessary to detect a mating of the charging connector 11 and the vehicle side connector 91.

In the present embodiment, based on the voltage detected by the DC voltmeter 29, the control unit 20 detects a mating of the charging connector 11 and the vehicle side connector 91. Next, a procedure for this mating detection will be described.

In an initial state where the vehicle side connector 91 and the charging connector 11 are not being mated, the control unit 20 de-energizes the coil 250 of the switching circuit 25 and connects the first contact 251 and the second contact 252 together. In this case, an output voltage of the DC power supply 26 appears at the P terminal 115 via the switch 121, but since the P terminal 115 is not being connected to the fifth terminal 915, no electric current flows in the resistor 261.

Meanwhile, when the charging connector 11 and the vehicle side connector 91 are mated together, since the P terminal 115 is connected to the ground potential via the fifth terminal 915 and the resistor 916, an electric current $I_1$ flows in the resistor 261. Thus, a voltage drop occurs across the resistor 261, so that the voltage detected by the DC voltmeter 29 changes. Thus, the control unit 20 can detect that the charging connector 11 and the vehicle side connector 91 have been mated together.

Further, when the control unit 20 detects that the charging connector 11 and the vehicle side connector 91 have been mated together, the control unit 20 energizes the coil 250 of the switching circuit 25 and connects the first contact 251 and the third contact 253 together. Thus, a voltage is output from the DC power supply 923 to the ground potential via the resistor 924, the fifth terminal 915, the P terminal 115, the switch 121, and the resistor 27, resulting in a potential difference across the resistor 27.

Meanwhile, when the charging connector 11 is disengaged from the vehicle side connector 91, since no electric current flows in the resistor 27, the potential difference across the resistor 27 changes. The control unit 20 detects the change in the potential difference with the DC voltmeter 28, and detects that the charging connector 11 is disengaged from the vehicle side connector 91. Also by the release button 120 being pressed, the second contact 121b and the first contact 121a of the switch 121 are non-connected, thereby varying the electric current flowing in the resistor 27, resulting in a potential difference change across the resistor 27. Thus, the control unit 20 can also detect that the release button 120 is pressed.

Further, by detecting a change in the voltage at one end of the resistor 924 due to the change in the electric current $I_2$ flowing through the resistor 924, the controller 93 of the vehicle 9 can detect that the charging connector 11 is disengaged from the vehicle side connector 91, and detect that the release button 120 is pressed.

(Self-Diagnostic Function of the Vehicle Battery Charger)

The vehicle charging device 1 has a self-diagnosis function to diagnose whether fault due to sticking occurs in the first relay 21 and the second relay 22. In the present embodiment, the self-diagnosis function is performed by the control unit 20. In other words, in the present embodiment, the control unit 20 functions as a fault diagnosing means for diagnosing a fault in the first relay 21 and the second relay 22. Note that the sticking of the first relay 21 and the second relay 22 means that the contacts 211 and 221 remain closed even when the coils 210 and 220 are de-energized.

At a time of starting and/or stopping a supply of the charging current to the vehicle 9, if a given condition is satisfied, the control unit 20 executes a diagnosis of the fault, or if the given condition is not satisfied, the control unit 20 does not execute a diagnosis of the fault. In the present embodiment, if history information on an operating condition of the vehicle battery charger 1 satisfies a predetermined condition, the given condition is satisfied.

It should be noted that a time of starting a supply of the charging current refers not necessarily to a moment at which the charging current is output from the vehicle battery charger 1, but to a period after the charging connector 11 is mated to the vehicle side connector 91 and until an electric current to charge the rechargeable battery 94 is output from the charging connector 11. Also, the time of stopping a supply of the charging current refers to a given period of time (e.g. within one minute) after stopping an output of the charging current due to the charging connector 11 being disengaged from the vehicle side connector 91, or having received from the vehicle 9 or externally a signal indicative of an end of charging.

The operation of the control unit 20 as the fault diagnosing means will be described in detail with reference to the flowcharts of FIGS. 4 to 6.

FIGS. 4 to 7 are a flowchart illustrating a specific example of a processing executed by the control unit 20. This processing is a processing to be executed by the CPU of the control unit 20 based on a program pre-stored in a storage element of the control unit 20. The control unit 20 executes the processing shown in FIGS. 4 to 7 repeatedly at a given cycle.

The control unit 20 first determines whether the control unit 20 has received a reset signal or not (step S10). The reset signal is a signal that is turned on by operator or user switch operation, for example, when the first relay 21 or the second relay 22 is replaced.

If the reset signal is on, i.e. if the control unit 20 determines that the reset signal is received (step S10: Yes), the control unit 20 initializes an elapsed time timer value T and an integrated value W for the charging current to 0 (step S11). The elapsed time timer value T may be obtained as e.g. numerical data which is incremented by a timer interrupt generated at a constant time interval (e.g. 100 ms).

Next, the control unit 20 determines whether the elapsed time timer value T is 0 or not (step S12). Here, "the elapsed time timer value T is 0" refers to "the elapsed time timer value T is initialized to 0 by the processing in step S11." If the elapsed time timer value T is 0 (step S12: Yes), the control unit 20 executes a self-diagnosis (step S26) which will be described later.

If the elapsed time timer value T is not 0 (step S12 No), the control unit 20 starts the elapsed time timer (step S13). If the elapsed time timer value T is initialized to 0 by the processing in step S11, the elapsed time from a time of a first execution of processing in step S13 after that initialization is obtained as the elapsed time timer value T. Incidentally, if the processing of step S13 is executed when the elapsed time timer has already been started, the elapsed time operation is continuously performed without the elapsed time timer value T being changed by that processing.

Next, the control unit 20 executes a mating detection (step S14). The mating detection refers to determining whether or not the charging connector 11 is mated to the vehicle side connector 91. The mating detection will be described in detail later.

If in the mating detection the control unit 20 determines that no mating is made (S15: No), the control unit 20 again executes the mating detection (step S14). If in the mating detection the control unit 20 determines that mating is made (S15: Yes), the control unit 20 determines whether a self-diagnosis flag S is 1 or not (step S16). If the self-diagnosis flag S is not 1 (S16: No), the control unit 20 determines whether the elapsed time timer value T is greater than or equal to a given threshold $SH_0$ or not (step S17). The threshold $SH_0$ may be e.g. 720 hours. If the elapsed time timer value T is greater than or equal to the threshold value $SH_0$ (step S17: Yes), the control unit 20 executes the self-diagnosis (step S26). If the elapsed time timer value T is less than the threshold $SH_0$ (S17: No), the processing of the flowchart shown in FIG. 4 is ended.

On the other hand, if the self-diagnosis flag S is 1 (S16: Yes), the control unit 20 outputs a first on signal to turn on the first relay 21, and a second on signal to turn on the second relay 22 (step S18). The first on signal and the second on signal provide an electric current in the coil 210 of the first relay 21 and the coil 220 of the second relay 22. Next, the control unit 20 sets the self-diagnosis flag S to 0 (step S19). If a condition is determined as normal by self-diagnosing (step S26) which will be described later, the self-diagnosis flag S is 1. Therefore, if the processing of step S16 is again executed without self-diagnosing, its determined result is No.

Next, the control unit 20 samples the charging current based on a detected signal of the electric current sensor 231, and integrates this electric current sampled (step S20). Here, the "integrate" refers to computing a new integrated value (integrated value W for the charging current) by adding that newly sampled value to an integrated value of cumulatively added preceding sampled results.

Next, the control unit 20 executes disengagement detection (step S21). The disengagement detection is a processing for determining whether or not the charging connector 11 is disengaged from the vehicle side connector 91. This disengagement detection will be described in detail later. If the control unit 20 determines by the disengagement detection that a disengagement has occurred (step S22: Yes), the control unit 20 stops the outputting of the first on signal and the second on signal (step S24). Thus, the provision of the electric current to the coil 210 of the first relay 21 and the coil 220 of the second relay 22 is interrupted, and the first relay 21 and the second relay 22 are turned off.

On the other hand, if the control unit 20 determines that no disengagement has occurred by the disengagement detection (step S22: No), the control unit 20 determines whether charging has finished or not, i.e., whether it has received from the vehicle 9 or externally a signal indicative of an end of charging (step S23). If the control unit 20 determines that the charging has finished (step S23: Yes), the control unit 20 executes the processing in step S24, and turns off the first relay 21 and the second relay 22. On the other hand, if the control unit 20 determines that charging has not finished (step S23: No), the control unit 20 again executes the processings of steps S20 to S23.

Further, after the processing of step S24, the control unit 20 determines whether the integrated value W for the charging current computed by the processing in step S20 is greater than or equal to a given threshold value $SH_1$ or not (step S25). If the integrated value for the charging current W is greater than or equal to the threshold value $SH_1$ (step S25: Yes), the control unit 20 executes the self-diagnosis (step S26). This threshold value $SH_1$ may be e.g. 90 Ah (equivalent to 15 A×5 hours× 75%). On the other hand, if the integrated value W for the charging current is less than the threshold value $SH_1$ (step S25: No), the control unit 20 ends the processing of the flowchart shown in FIG. 4 without self-diagnosing.

Figure 4:
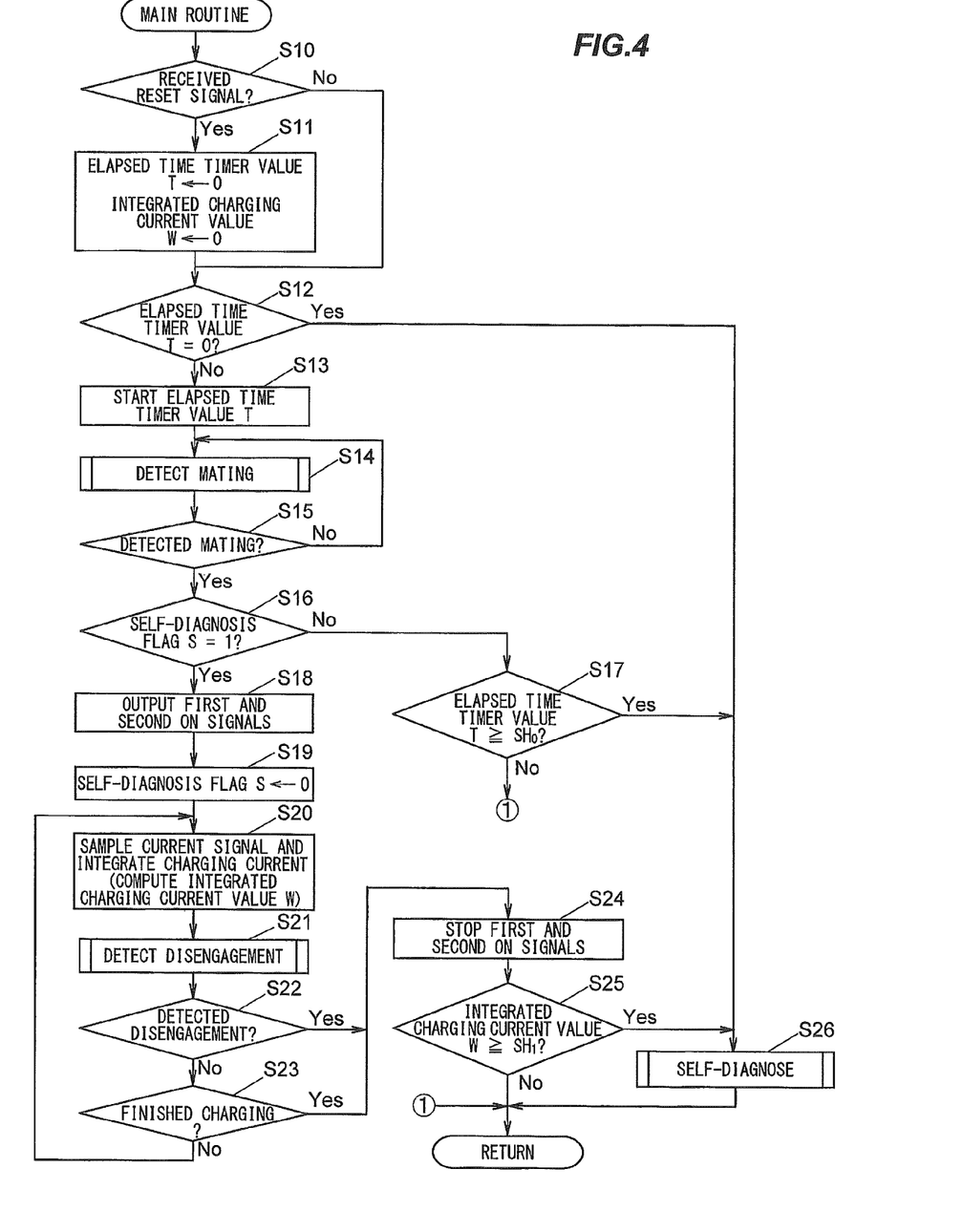
FIG. 4 is a flowchart illustrating a specific example of a processing executed by a control unit of the vehicle battery charger.
Figure 5:
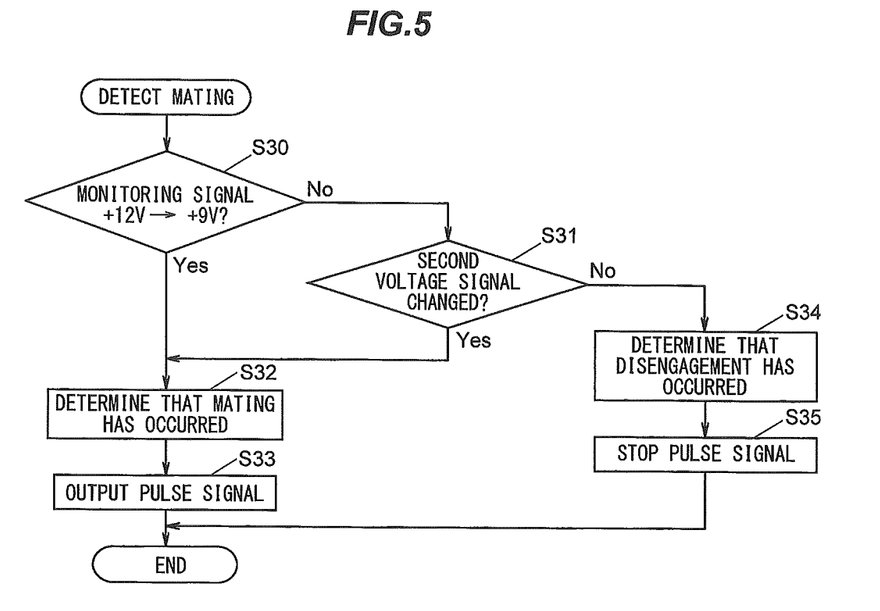
FIG. 5 is a flowchart illustrating a specific example of a processing executed by the control unit of the vehicle battery charger.

FIG. 5 is a flowchart showing a detailed processing for the mating detection in step S14 in FIG. 4.

In this mating detection, the control unit 20 monitors the fourth electric wire 134 side (C terminal 114 side) voltage (monitoring signal) of the communication resistor 201, and determines whether this voltage has changed from +12 V to +9 V (step S30). If the vehicle 9 is in compliance with the standard SAE J1772, this processing is a processing for detecting that the charging connector 11 is mated to the vehicle side connector 91. That is, if the vehicle 9 is in compliance with the SAE J1772, when the charging connector 11 is mated to the vehicle side connector 91, the voltage at the C terminal 114 of the charging connector 11 is changed from +12 V into +9 V by the electric circuit of the vehicle 9. In step 30, from this voltage change, it is detected that the charging connector 11 is mated to the vehicle side connector 91.

If a determined result in step S30 is No, i.e. if the monitoring signal is +12 V, the control unit 20 determines, from a change of the second voltage signal detected by the DC voltmeter 29, whether the charging connector 11 is mated to the vehicle side connector 91 or not (step S31). Here, "the determined result in step S30 is No" means that the charging connector 11 is disengaged from the vehicle side connector 91, or that the vehicle 9 is not in compliance with the standard SAE J1772.

If the determined result in step S30 or step S31 is Yes, the control unit 20 determines that the charging connector 11 is mated to the vehicle side connector 91 (step S32), and outputs a pulse signal to the vehicle 9 via the communication resistor 201 (step S33). This pulse signal is designed for communication with the vehicle in compliance with the standard of SAE J1772. This pulse signal allows the control unit 20 to transmit information on a rated value of the charging current and the like to the vehicle.

On the other hand, if in step S31 the control unit 20 determines that the charging connector 11 is not being mated to the vehicle side connector 91 (S31: No), the control unit 20 determines that the charging connector 11 is disengaged from the vehicle side connector 91 (step S34), and stops the outputting of the pulse signal (step S35).

Figure 6:
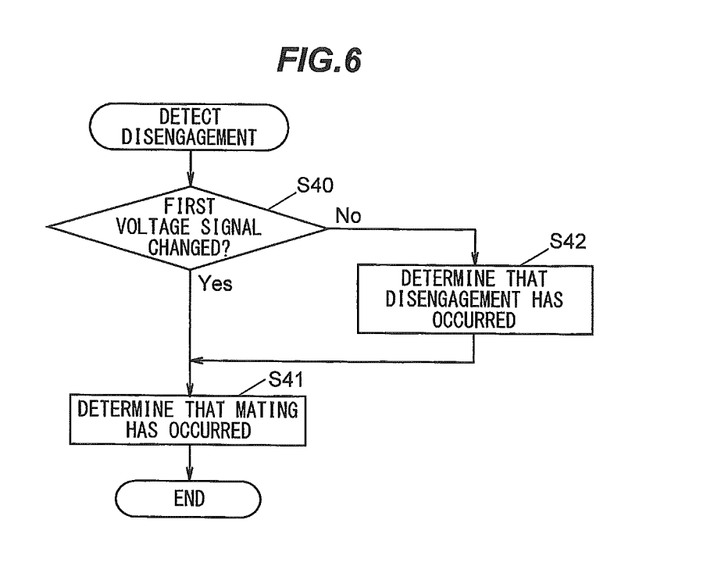
FIG. 6 is a flowchart illustrating a specific example of a processing executed by the control unit of the vehicle battery charger.

FIG. 6 is a flowchart illustrating a detailed processing for the disengagement detection in step S21 in FIG. 4.

In this disengagement detection, the control unit 20 determines whether the charging connector 11 is disengaged from the vehicle side connector 91 or not from a change of the first voltage signal detected by the DC voltmeter 28 (step S40). As described above, when the charging connector 11 is disengaged from the vehicle side connector 91, since no electric current flows in the resistor 27, the voltage at one end of the resistor 27 which is detected by the DC voltmeter 28 changes, resulting in a change in the first voltage signal output from the DC voltmeter 28. Also, by the release button 120 being pressed, the second contact 121b and the first contact 121a of the switch 121 are non-connected, thereby varying the electric current flowing in the resistor 27, resulting in a change in the first voltage signal.

The control unit 20 determines that if the first voltage signal has changed, a disengagement has occurred (step S41), or determines that if the first voltage signal has not changed, a mating has occurred (step S42).

Figure 7:
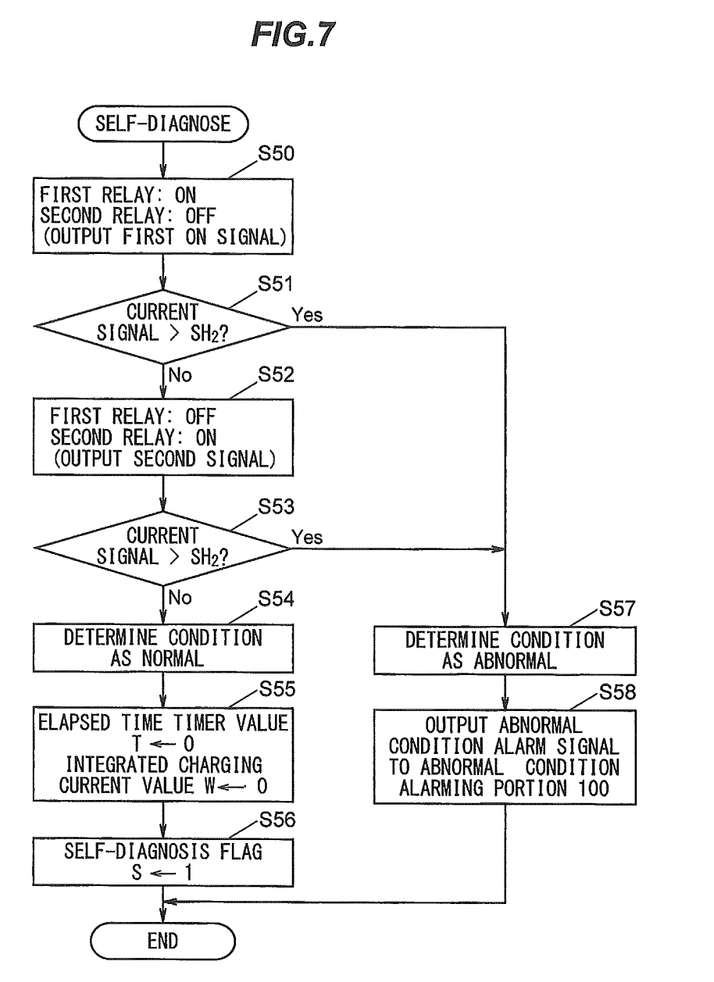
FIG. 7 is a flowchart illustrating a specific example of a processing executed by the control unit of the vehicle battery charger.

FIG. 7 is a flowchart illustrating a detailed processing for the self-diagnosis in step S26 in FIG. 4. By separately switching operating conditions (on state and off state) of the first relay 21 and the second relay 22, the control unit 20 diagnoses whether the first relay 21 or the second relay 22 is not sticking.

In this self-diagnosis, the control unit 20 outputs the first on signal to provide an electric current to the coil 210 of the first relay 21, but no second on signal is output, and no electric current is provided in the coil 220 of the second relay 22 (step S50).

Next, the control unit 20 determines whether in this condition a signal (an electric current signal) indicative of an electric current Io outputted by the electric current sensor 231 exceeds a given threshold value $SH_2$ or not (step S51). The threshold value $SH_2$ is a value of the electric current signal when the electric current Io is e.g. 15 mA.

If the electric current signal exceeds the threshold value $SH_2$ (S51: Yes), the second relay 22 to be in the off state is sticking, thereby allowing the control unit 20 to determine that an electric current is flowing through the diagnostic resistor 24, therefore determining the condition as abnormal (step S57), and outputting an abnormal condition alarm signal to the abnormal condition alarming portion 100, thereby alarming the occurrence of the abnormal condition (step S58).

On the other hand, if the electric current signal is less than or equal to the threshold value $SH_2$, the control unit 20 outputs the second on signal to provide an electric current to the coil 220 of the second relay 22, but no first on signal is output, and no electric current is provided in the coil 210 of the first relay 21 (step S52).

Next, the control unit 20 determines whether in this condition the electric current signal exceeds the threshold value $SH_2$ or not (step S53). If the electric current signal exceeds the threshold value $SH_2$ (S53: Yes), the first relay 21 to be in the off state is sticking, thereby allowing the control unit 20 to determine that an electric current is flowing through the diagnostic resistor 24, therefore determining the condition as abnormal (step S57), and outputting an abnormal condition alarm signal to the abnormal condition alarming portion 100, thereby alarming the occurrence of the abnormal condition (step S58).

On the other hand, if the electric current signal is less than or equal to the threshold value $SH_2$ (S33: No), the control unit 20 determines the condition as normal, and sets the elapsed time timer value T and the integrated value W for the charging current, which are condition index values for self-diagnosis execution, at 0 (step S55). In addition, the control unit 20 sets the self-diagnosis flag S at 1.

As described above, in the present embodiment, the self-diagnosis is executed by the control unit 20 using the elapsed time timer value T and the integrated value W for the charging current as the history information on the operating condition of the vehicle battery charger 1, and if these index values are greater than or equal to the predetermined thresholds $SH_0$ and $SH_1$, respectively. Here, the elapsed time timer value T to be compared in step S17 is the elapsed time from a time of a preceding self-diagnosis execution or from a time of a reset signal reception. In addition, the integrated value W for the charging current to be compared in step S25 is the integrated value for the charging current from a time of a preceding self-diagnosis execution or from a time of a reset signal reception.

(Functions and Advantageous Effects of the First Embodiment)

The first embodiment described above has functions and advantageous effects described below.

(1) The self-diagnosis is performed only if a given condition is satisfied, rather than each and every time of starting and stopping of the charging current. As compared with when the self-diagnosis is performed each and every time, the frequency of operation of the first relay 21 and the second relay 22 is therefore reduced. This allows for suppressing the degradation of contact performance of the respective contacts 211 and 221 of the first relay 21 and the second relay 22, and enhancing the durability of the vehicle battery charger 1.

(2) As a condition for determining whether to execute the self-diagnosis or not, the integrated value for the charging current is used. It is therefore possible to optimize this determination. That is, because the larger the amount of the energizing current, the more likely the contact performance of the respective contacts 211 and 221 of the first relay 21 and the second relay 22 is to degrade, the use of the integrated value for the charging current to determine whether to execute the self-diagnosis or not allows the optimization of the frequency of the self-diagnosis.

(3) Further, in the present embodiment, as a condition for determining whether to execute the self-diagnosis or not, the elapsed time from a time of a preceding self-diagnosis execution is used. It is therefore possible to optimize this determination. That is, because the degradation of contact performance of the respective contacts 211 and 221 of the first relay 21 and the second relay 22 due to, for example, ingress of water is likely to progress with elapsing time due to long-term use thereof, the use of the elapsed time from a time of a preceding self-diagnosis execution to determine whether to execute the self-diagnosis or not allows the optimization of the frequency of the self-diagnosis.

(Modifications to the First Embodiment)

Although in the example shown in FIG. 4, in step S20, the charging current detected based on the signal detected by the electric current sensor 231 is integrated, if the electric current value for the charging current detected exceeds a given value, its excess electric current value may instead be integrated. As the given value, there may be used, for example, a rated output electric current of the vehicle battery charger 1.

For example, if the rated output electric current of the vehicle battery charger 1 is 15 A, and the actual charging current is 16 A, 1 A corresponding to the difference therebetween is integrated. The processings in the other steps may be common to those shown in FIGS. 4 to 7. However, it is desirable that the threshold value $SH_1$ in step S25 is set to be smaller than the above described value. The threshold $SH_1$ in the present modification may be e.g. 9.0 Ah (equivalent to 18 A×0.5 hours).

In this modification, especially at the time of high current energization which causes the severe degradation of the contact performance, the self-diagnosis is executed based on the integrated value for the excess of the electric current exceeding the given value. This modification therefore allows the optimization of the frequency of the self-diagnosis.

Second Embodiment

Next will be described a second embodiment according to the invention with reference to FIG. 8.

Figure 8:
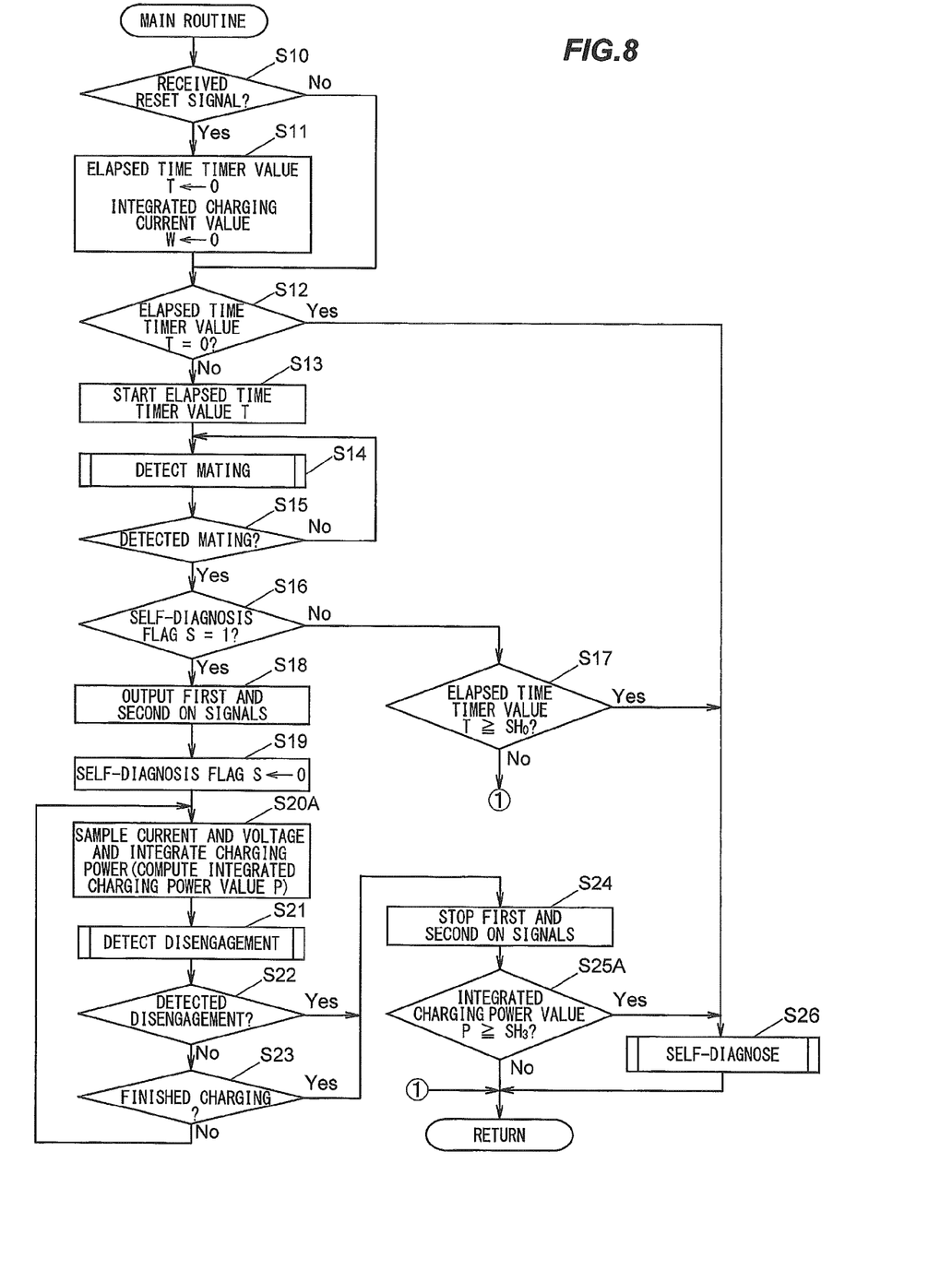
FIG. 8 is a flowchart illustrating a specific example of a processing executed by a control unit in a second embodiment according to the invention.

FIG. 8 is a flowchart illustrating a specific example of a processing executed by the control unit 20 in the present embodiment. In the first embodiment, in step S20, the charging current detected based on the signal detected by the electric current sensor 231 is integrated, whereas in the second embodiment, in step S20A, the charging current is detected, a potential difference (charging voltage) between the first electric wire 131 and the second electric wire 132 is detected by the AC voltmeter 232, charging power which is the product of the charging current and the charging voltage is computed, and this charging power is integrated to thereby compute an integrated value P for the charging power. Then, in step S25A, the integrated value P for the charging power is compared with a threshold value $SH_3$. If the integrated value P for the charging power is greater than or equal to the threshold value $SH_3$, the self-diagnosis is executed. The processings in the other steps are the same as in the first embodiment.

The threshold value $SH_3$ in step S25A may be e.g. 21 kWh (equivalent to 15 A×8 hours×220V×75%). In this case, when the self-diagnosis is executed, the integrated value P for the charging power is cleared by the processing in step S55. Therefore, the integrated value for the charging current to be compared in step S25A is the integrated value for output power (charging power output by the vehicle battery charger 1) from a time of a preceding self-diagnosis execution.

As described above, in the present embodiment, the self-diagnosis is executed by the control unit 20 using the integrated value for the charging power as the history information on the operating condition of the vehicle battery charger 1, and if this integrated value for the charging power is greater than or equal to the predetermined threshold value $SH_3$. Because the larger the amount of the electric power output to the vehicle 9, the more likely the contact performance of the respective contacts 211 and 221 of the first relay 21 and the second relay 22 is to degrade, the use of the integrated value for the charging power to determine whether to execute the self-diagnosis or not allows the optimization of the frequency of the self-diagnosis.

(Modifications to the Second Embodiment)

Although in the example shown in FIG. 8, in step S20A, the charging power obtained based on the charging current and the charging voltage detected is integrated, if the charging power exceeds a given value, its excess charging power may instead be integrated. As the given value, there may be used, for example, a rated output electric power of the vehicle battery charger 1.

The processing in the other steps may be common to that shown in FIG. 8. However, it is desirable that the threshold value $SH_3$ in step S25A is set to be smaller than the above described value. The threshold $SH_3$ in the present modification may be e.g. 2.0 kWh (equivalent to 18 A×0.5 hours× 220V).

In this modification, especially at the time of high current energization which causes the severe degradation of the contact performance, the self-diagnosis is executed based on the excess of the charging power exceeding the given value. This modification therefore allows the optimization of the frequency of the self-diagnosis.

Third Embodiment

Next, a third embodiment according to the invention with reference to FIG. 9 will be described.

Figure 9:
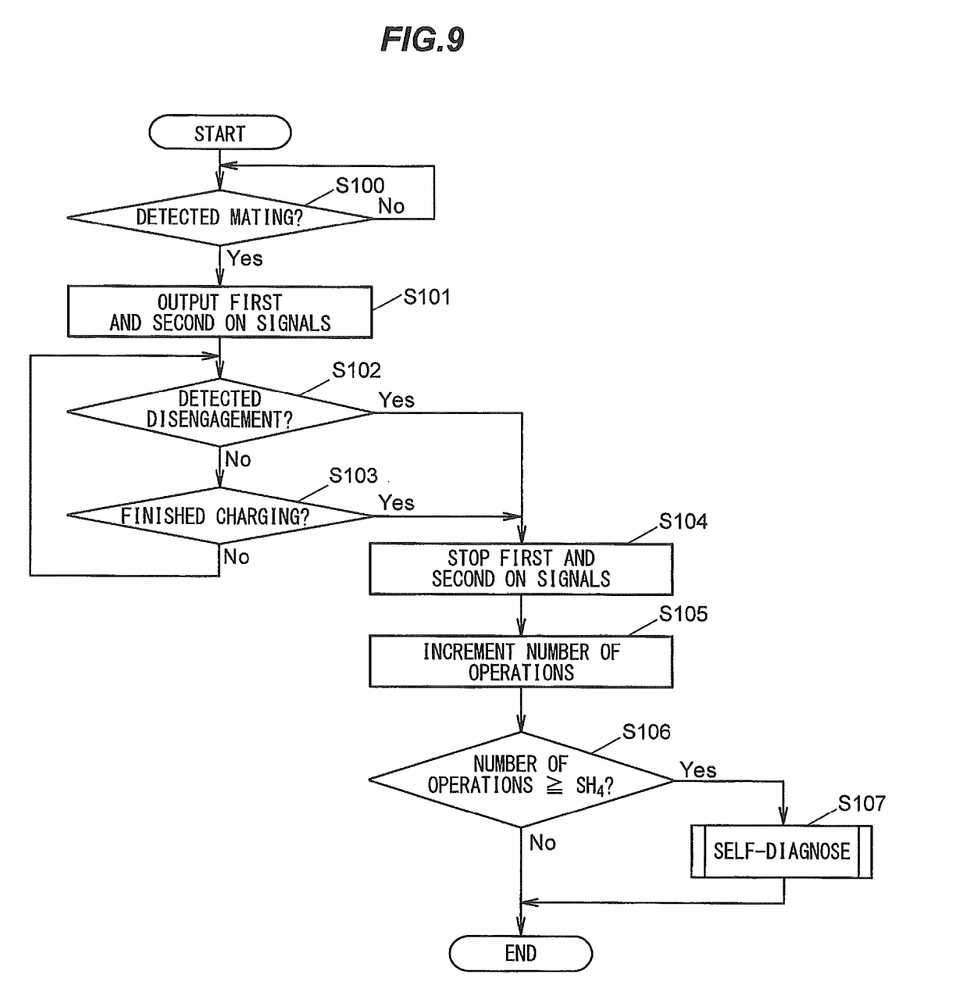
FIG. 9 is a flowchart illustrating a specific example of a processing executed by a control unit in a third embodiment according to the invention.

FIG. 9 is a flowchart illustrating a specific example of a processing executed by the control unit 20 in the present embodiment.

The control unit 20 determines whether the charging connector 11 is mated to the vehicle side connector 91 or not from a change of the voltage detected by the DC voltmeter 29 (step S100). If the mating is not detected (S100: No), the control unit 20 repeatedly executes the determination in step S100 every given time, for example.

If the mating of the charging connector 11 and the vehicle side connector 91 is detected in step S100 (S100: Yes), the control unit 20 outputs the first on signal to turn on the first relay 21, and the second on signal to turn on the second relay 22, turning on both the first relay 21 and the second relay 22 (step S101). Thus, the charging current is output to the vehicle 9.

Next, the control unit 20 determines whether the charging connector 11 is disengaged from the vehicle side connector 91 or not from a change of the voltage detected by the DC voltmeter 28 (step S102). Further, the control unit 20 determines whether the control unit 20 has received a signal indicative of an end of charging from the vehicle 9 or externally (step S103).

If the control unit 20 detects a disengagement of the charging connector 11 from the vehicle side connector 91 (S102: Yes), or detects an end of charging (step S103: Yes), the control unit 20 stops the outputting of the first on signal and the second on signal, turning off both the first relay 21 and the second relay 22 (step S104). Thus, the connection between the L phase power line 141 and the first electric wire 131, and the connection between the N phase power line 142 and the second electric wire 132 are interrupted.

Next, the control unit 20 increments the number of operations of the first relay 21 and the second relay 22 (step S105). In other words, the control unit 20 adds 1 to the number of operations stored therein of the first relay 21 and the second relay 22.

Next, the control unit 20 determines whether the number of operations incremented in step S105 is greater than or equal to a given threshold value $SH_4$ (step S106). If the number of operations is greater than or equal to the given threshold value $SH_4$ (S106: Yes), the control unit 20 executes the self-diagnosis (step S107). This threshold value $SH_4$ may be e.g. 10 times.

By completing the self-diagnosis in step S107, the control unit 20 ends the processings. On the other hand, when the result of the determination in step S106 is No, the control unit 20 ends the processing without self-diagnosing.

In this case, when the self-diagnosis is executed, the number of operations of the first relay 21 and the second relay 22 is cleared by the processing in step S55. Therefore, the number of operations to be compared in step S106 is a count value of the number of operations of the first relay 21 and the second relay 22 from a time of a preceding self-diagnosis execution.

As described above, in the present embodiment, the self-diagnosis is executed by the control unit 20 using the count value of the number of operations of the first relay 21 and the second relay 22 as the history information on the operating condition of the vehicle battery charger 1, and if this count value of the number of operations is greater than or equal to the predetermined threshold value $SH_4$. Because the larger the number of operations (the number of switchings from the on state to the off state), the more likely the contact performance of the respective contacts 211 and 221 of the first relay 21 and the second relay 22 is to degrade, the use of the count value of the number of operations to determine whether to execute the self-diagnosis or not allows the optimization of the frequency of the self-diagnosis.

Fourth Embodiment

Next will be described a fourth embodiment according to the invention with reference to FIG. 10.

Figure 10:
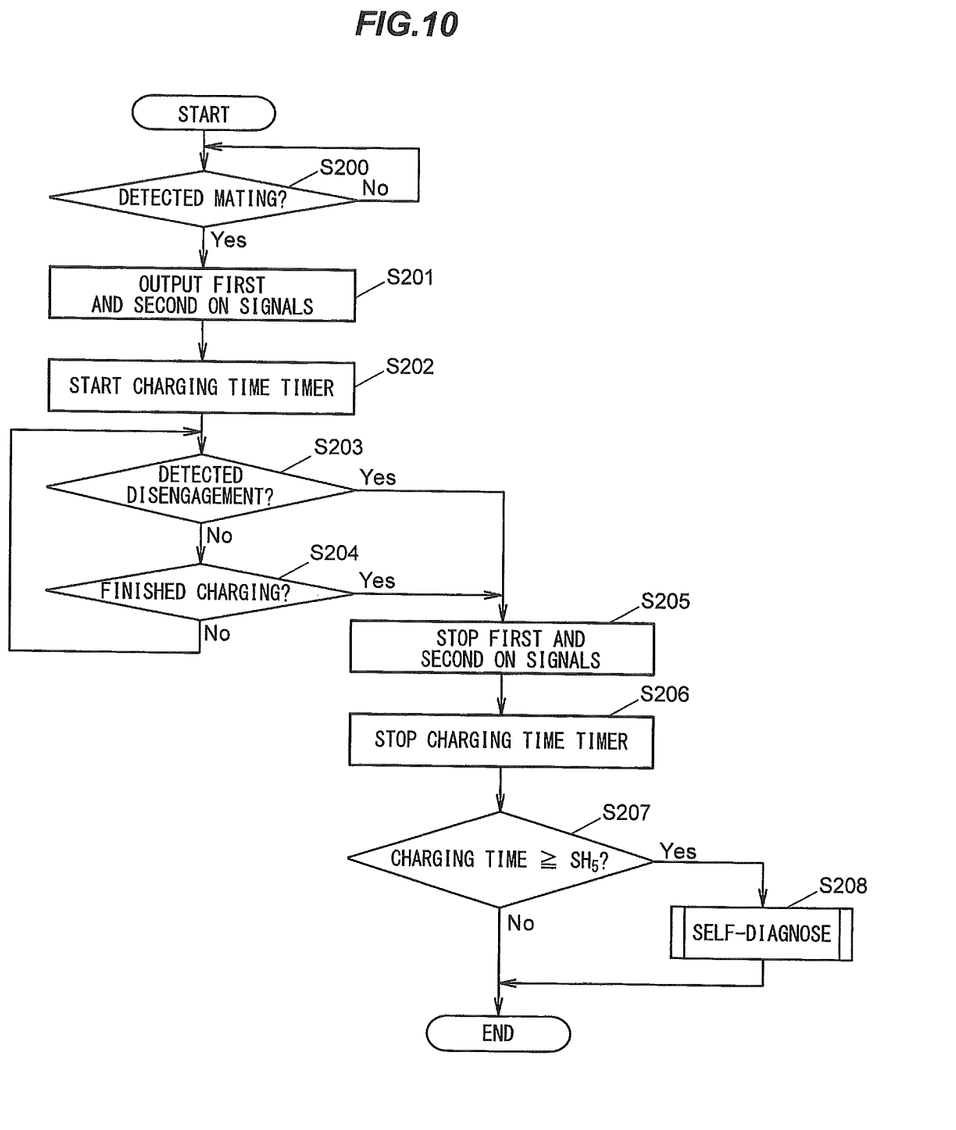
FIG. 10 is a flowchart illustrating a specific example of a processing executed by a control unit in a fourth embodiment according to the invention.

FIG. 10 is a flowchart illustrating a specific example of a processing executed by the control unit 20 in the present embodiment.

In the flowchart shown in FIG. 10, the control unit 20 outputs the first on signal to turn on the first relay 21, and the second on signal to turn on the second relay 22, turning on both the first relay 21 and the second relay 22 (step S201), and subsequently starting a charging time timer (step S202). Also, the control unit 20 turns off both the first relay 21 and the second relay 22 (step S205), and subsequently stops the charging time timer (step S206), and determines whether an integrated value for a charging time (a timer value for the charging time timer) is greater than or equal to a threshold value $SH_5$ or not (step S207).

As a result of this determination, if the integrated value for the charging time is greater than or equal to the threshold value $SH_5$ (S207: Yes), the control unit 20 executes the self-diagnosis (step S208), and returns the processing to step S200. On the other hand, if the integrated value for the charging time is less than the threshold value $SH_5$ (S207: No), the control unit 20 returns the processing to step S200 without executing the self-diagnosing.

The processing in steps S200, S201, S203, S204, and S205 in the flowchart of FIG. 10 are the same as the processings in steps S100 to S104 in the flowchart of FIG. 9.

Incidentally, even when the charging time timer is stopped in step S206, the timer value for the charging time is not cleared, and when the charging time timer is started in step S202 in the next charging cycle, timing is resumed from a timer value at a time of stopping the charging time timer.

When the self-diagnosis is executed, the timer value for the charging time is cleared by the processing in step S55. Therefore, the charging time to be compared in step S207 is an integrated value for the charging time from a time of a preceding self-diagnosis execution.

As described above, in the present embodiment, the self-diagnosis is executed by the control unit 20 using the integrated value for the charging time as the history information on the operating condition of the vehicle battery charger 1, and if this integrated value for the charging time is greater than or equal to the predetermined threshold value $SH_5$. Because the longer the charging time, the more likely the contact performance of the respective contacts 211 and 221 of the first relay 21 and the second relay 22 is to degrade, the use of the integrated value for the charging time to determine whether to execute the self-diagnosis or not allows the optimization of the frequency of the self-diagnosis.

Although the embodiments of the present invention have been described above, the embodiments described above should not be construed to limit the invention in the appended claims. It should also be noted that not all the combinations of the features described in the above embodiments are essential to the means for solving the problems of the invention.

Further, the present invention may be appropriately modified and practiced without departing from the spirit thereof. For example, the determination of whether or not to perform the self-diagnosis may be made by a logical addition combining a plurality of conditions (conditions for determining whether or not to perform the self-diagnosis) described in the first to the fourth embodiments and the modifications thereto.

Although the invention has been described with respect to the specific embodiments for complete and clear disclosure, the appended claims are not to be thus limited but are to be construed as embodying all modifications and alternative constructions that may occur to one skilled in the art which fairly fall within the basic teaching herein set forth.

What is claimed is:

1. A vehicle battery charger for providing a charging current to a rechargeable vehicle battery which stores electric traction power, comprising:
   a relay for interrupting the charging current,
   fault diagnosing means for switching an operating condition of the relay to thereby diagnose a fault in the relay,
   wherein at a time of starting and/or stopping a supply of the charging current, if a given condition is satisfied, the fault diagnosing means executes a diagnosis of the fault, or if the given condition is not satisfied, the fault diagnosing means does not execute a diagnosis of the fault,
   wherein the given condition is that history information on an operating condition of the vehicle battery charger satisfies a predetermined condition, and
   wherein the given condition is that an integrated value for the charging current from a time of a preceding diagnosis execution based on the history information is not less than a given threshold.

2. A vehicle battery charger for providing a charging current to a rechargeable vehicle battery which stores electric traction power, comprising:
   a relay for interrupting the charging current,
   fault diagnosing means for switching an operating condition of the relay to thereby diagnose a fault in the relay,
   wherein at a time of starting and/or stopping a supply of the charging current, if a given condition is satisfied, the fault diagnosing means executes a diagnosis of the fault, or if the given condition is not satisfied, the fault diagnosing means does not execute a diagnosis of the fault,
   wherein the given condition is that history information on an operating condition of the vehicle battery charger satisfies a predetermined condition, and
   wherein the given condition is that an integrated value for output power of the battery charger from a time of a preceding diagnosis execution based on the history information is not less than a given threshold.

3. A vehicle battery charger for providing a charging current to a rechargeable vehicle battery which stores electric traction power, comprising:
   a relay for interrupting the charging current,
   fault diagnosing means for switching an operating condition of the relay to thereby diagnose a fault in the relay,
   wherein at a time of starting and/or stopping a supply of the charging current, if a given condition is satisfied, the fault diagnosing means executes a diagnosis of the fault, or if the given condition is not satisfied, the fault diagnosing means does not execute a diagnosis of the fault,
   wherein the given condition is that history information on an operating condition of the vehicle battery charger satisfies a predetermined condition; and
   wherein the given condition is that an integrated value for a number of operations of the relay from a time of a preceding diagnosis execution based on the history information is not less than a given threshold.

* * * * *